US006865040B2

(12) United States Patent
Fayeulle et al.

(10) Patent No.: US 6,865,040 B2
(45) Date of Patent: Mar. 8, 2005

(54) METHOD AND SYSTEM FOR MEASURING FLY HEIGHT

(75) Inventors: Serge Jacques Fayeulle, Longmont, CO (US); Paul W. Smith, Longmont, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 439 days.

(21) Appl. No.: 10/027,526

(22) Filed: Dec. 21, 2001

(65) Prior Publication Data

US 2002/0176185 A1 Nov. 28, 2002

Related U.S. Application Data

(60) Provisional application No. 60/292,668, filed on May 22, 2001.

(51) Int. Cl.[7] ........................ G11B 27/36; G11B 21/02; G11B 5/09
(52) U.S. Cl. .............................. 360/31; 360/75; 360/53
(58) Field of Search ............................ 360/31, 51, 53, 360/75

(56) References Cited

U.S. PATENT DOCUMENTS

| 4,931,887 A | 6/1990 | Hegde et al. ................. 360/75 |
| 5,189,377 A | 2/1993 | Rhoades et al. ............ 324/662 |
| 5,288,856 A | * 2/1994 | Ottesen et al. ................ 360/31 |
| 5,377,131 A | 12/1994 | Ottesen et al. ........... 364/724.1 |
| 5,392,173 A | 2/1995 | Kinoshita et al. |
| 5,831,781 A | 11/1998 | Okamura |
| 5,880,901 A | 3/1999 | Smith et al. .................. 360/75 |
| 5,949,066 A | 9/1999 | Rice et al. |
| 6,046,596 A | 4/2000 | Schaenzer et al. .......... 324/662 |
| 6,084,754 A | 7/2000 | Smith et al. ................. 360/135 |
| 6,088,200 A | * 7/2000 | Morita ........................ 360/135 |
| 6,154,335 A | 11/2000 | Smith et al. .................. 360/75 |
| 6,288,856 B1 | 9/2001 | Ottesen et al. |

FOREIGN PATENT DOCUMENTS

EP          0 326 683 A2    8/1989

* cited by examiner

*Primary Examiner*—Sinh Tran
*Assistant Examiner*—Glenda P. Rodriguez
(74) *Attorney, Agent, or Firm*—Brendan J. Hanley

(57) ABSTRACT

A system and method for measuring the fly height of a head flying over a disc in a disc drive is disclosed. A head is vertically spaced from a rotating disc surface by an air bearing surface. The disc has one or more radial grooves in the surface of the disc. As the disc rotates, the radial grooves on the disc pass under the head and induce a perturbation in the signal. By measuring the perturbations in the signal caused by the grooves in the disc surface, and by processing the measurement signal, a vertical spacing signal proportional to the vertical spacing between the disc and the head can be obtained.

16 Claims, 4 Drawing Sheets

FIG. 3 Isolated Readback Pulse with Slider Positioned as Shown:

METHOD AND SYSTEM FOR MEASURING FLY HEIGHT

RELATED APPLICATIONS

This application claims priority of U.S. provisional application Ser. No. 60/292,668, filed May 22, 2001, entitled "A New Method To Measure Fly Height In A Drive".

FIELD OF THE INVENTION

This invention relates generally to the field of data storage devices, and more particularly, but not by way of limitation, to a new system and method for measuring fly height between a head and a data storage surface.

BACKGROUND OF THE INVENTION

The invention relates to direct access data storage devices such as magnetic disc storage devices. In a magnetic disc storage device, a magnetic data storage disc spins at a high speed while a transducer (or head) is suspended slightly above the disc surface. The transducer flies above the disc surface on an air bearing. The transducer typically includes a magnetoresistive read element and an inductive write element on the slider, commonly called the head. The head writes information onto the disc in concentric circular tracks. Different tracks are accessed for writing or reading by changing the radial position of the recording head so as to position the head above the desired track.

One of the most important parameters in a high-density magnetic disc storage device is the height (the fly height) of the read and write elements on the recording head above the disc surface while the disc is spinning. Rapid and accurate measurement of this quantity is essential for the development of new slider designs. Such fly height measurement is also essential quality control during slider manufacture after the development of new slider designs.

It has been known, in general, to measure the fly height of a magnetic recording head by white light interferometry between a spinning transparent test disc and a slider flying above the test disc. While this technique is sufficiently precise for the current generation of products, the need to measure fly heights to accuracies of a fraction of a wavelength of light threatens to push past the limits of this measurement technique.

In another method of fly height measurement, the slider flies above the surface of an electrically conductive test disc. By measuring the capacitance between the electrically conductive slider and the electrically conductive disc, the fly height can be determined. The known capacitance measurement technique suffers several drawbacks. Since the entire test disc is conductive, in order to be accurate this technique requires careful accounting for stray capacitance. Moreover, this measurement technique provides only an average fly height measurement. It provides no detailed measurement of the fly height at different locations on the slider. For example, the tilt of the slider with respect to the disc cannot be measured by the known capacitance technique. The tilt of the slider is important in order to determine the fly height of the trailing edge of the slider. The fly height of the trailing edge of the slider is important because the trailing edge of the slider is closest to the disc, and because the read and write elements of the head are located on the trailing edge of the slider. Further since the known capacitance measurement technique cannot determine the tilt of the slider, only the relative fly height can be determined. The absolute fly height cannot be determined by measuring the total capacitance between the slider and the conductive disc surface. Accordingly, improvements are desired.

SUMMARY OF THE INVENTION

Against this backdrop the present invention has been developed. One example embodiment of the present invention is directed to a measurement system for determining fly height of a head in a disc system. The disc system has a head and a disc having a surface. The disc surface includes at least one radial groove. The head is coupled to a signal processing circuit for measuring a perturbation in a signal pulse generated when the head passes over the groove.

Another example embodiment of the present invention is directed to a method for determining the fly height of a head over a surface of a rotating disc media. In one example embodiment, the method includes rotating a disc in a data storage device, wherein the data storage device also includes at least one head suspended adjacent a surface of the disc. The surface of the disc includes a radial groove. A signal is generated when the groove in the rotating disc passes under the head. The signal includes a read back pulse width having amplitude. The fly height is calculated by measuring the pulse width of the signal when the amplitude of the signal is at 50% of its peak value and comparing the signal to a reference value.

Another example embodiment of the present invention is directed to a fly height measurement system. The fly height measurement system includes a spindle hub securing a data storage disc. The data storage disc has at least one radial groove in a surface of the disc. The measurement system further includes a head for reading and writing information to and from the disc when the disc is rotating. The measurement system also includes measuring means coupled to the head for determining the fly height between the head and the disc surface.

These and various other features as well as advantages which characterize the present invention will be apparent from a reading of the following detailed description and a review of the associated drawings.

DETAILED DESCRIPTION

Figure 1:
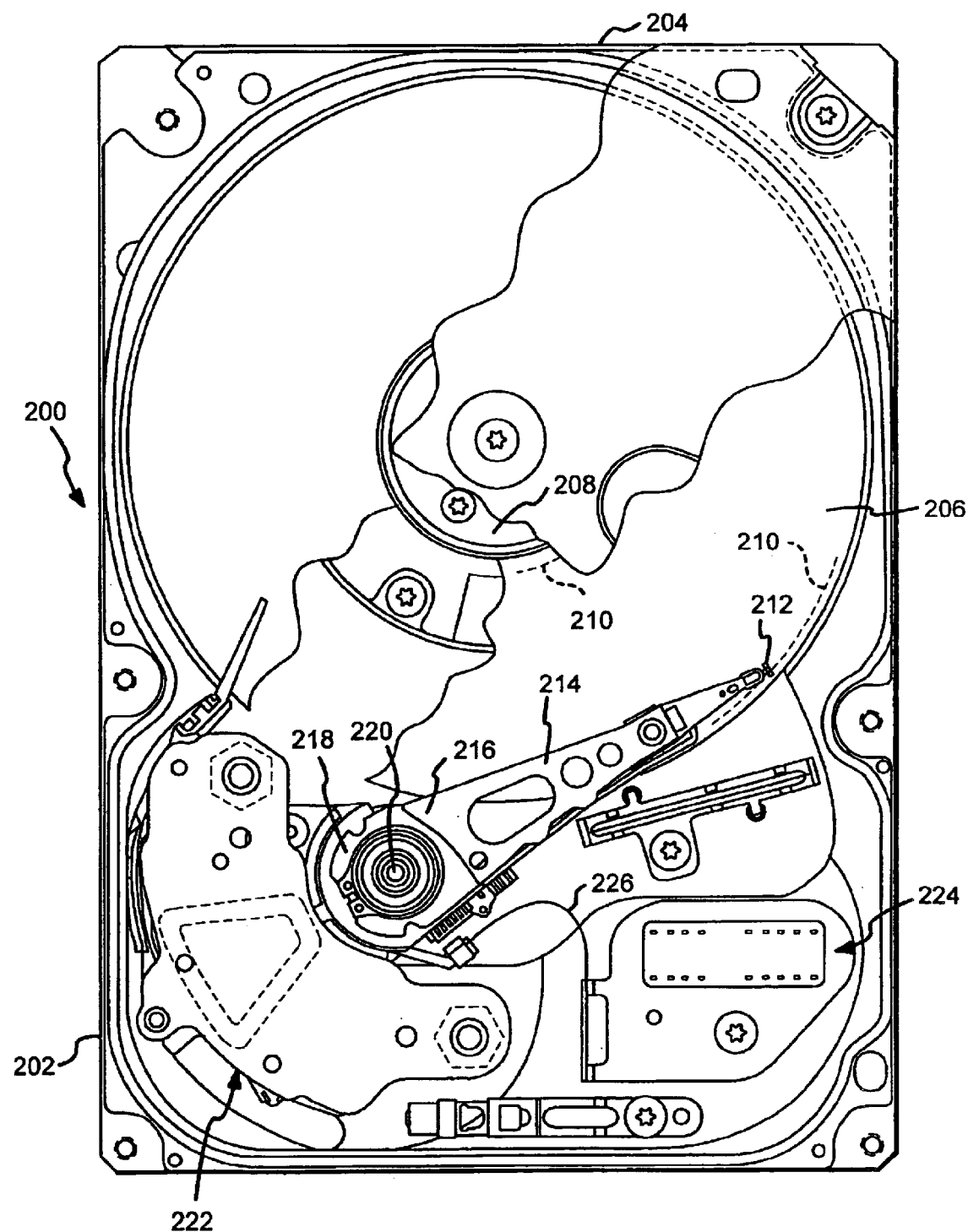
FIG. 1 is an example embodiment of a data storage device that can incorporate the present invention.
Figure 2:
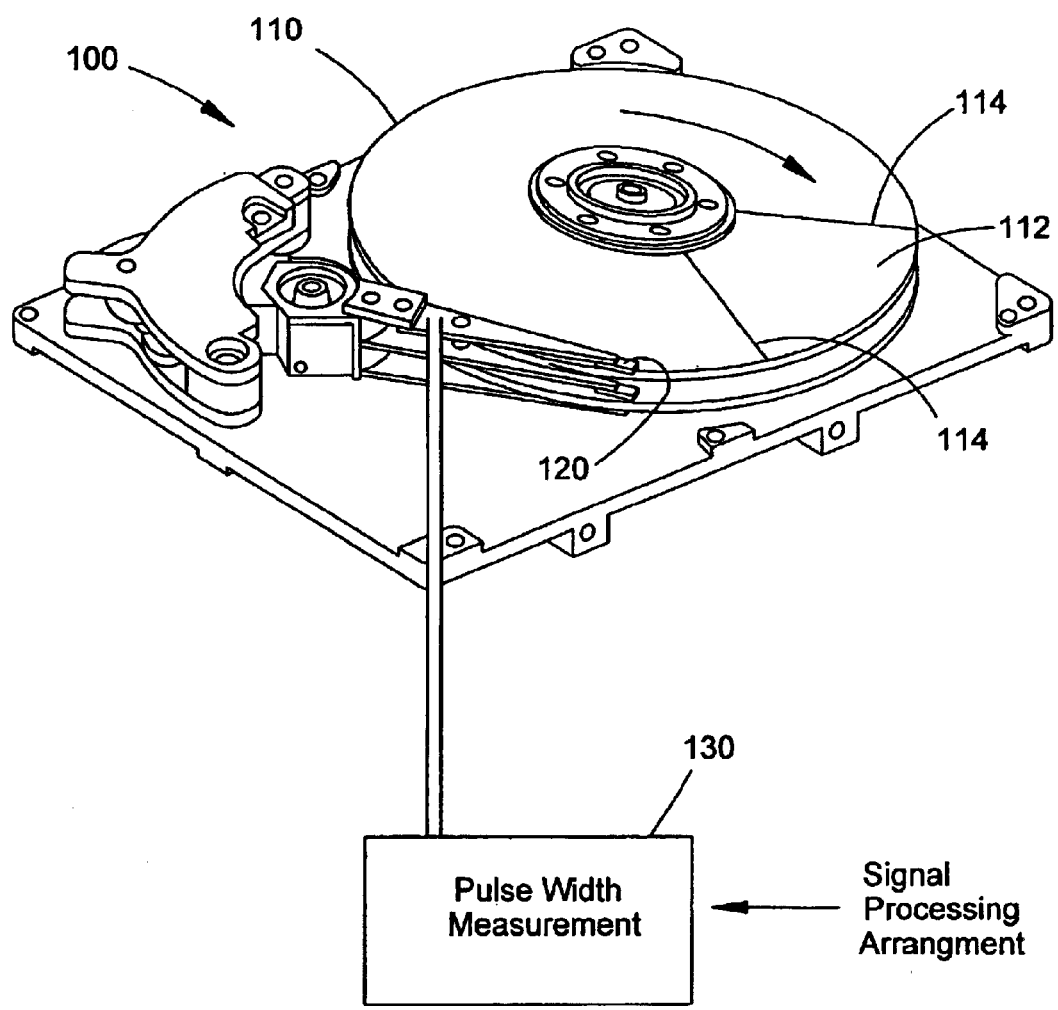
FIG. 2 is a schematic of an example embodiment of the present invention.

Turning now to the drawings, and specifically to FIG. 2, shown is a plan view of a disc drive 200 that can incorporate an example embodiment of the present invention. The disc drive 200 includes a base 202 to which all other components are directly or indirectly mounted and a top cover 204 (shown in partial cutaway) which, together with the base 202, forms a disc drive housing which encloses internal components and isolates these components of the disc drive 200 from external contaminants.

The disc drive 200 includes one or more discs 206 which are mounted for rotation on a spindle motor shown generally at 208. The discs 206 include on their surfaces a plurality of circular, concentric data tracks, the innermost and outermost of which are shown by dashed lines at 210, on which data are recorded via an array of vertically aligned head assemblies 212. The head assemblies 212 are supported by head suspensions, or flexures 214, which are attached to actuator arms 216. The actuator arms 216 are integral to an actuator bearing housing 218 that is mounted via an array of precision ball bearing assemblies (not designated) for rotation about a pivot shaft 220.

Power to drive the actuator bearing housing 218 in its rotation about the pivot shaft 220 is provided by a voice coil motor (VCM) shown generally at 222. The VCM 222 consists of a coil (not separately designated) which is supported by the actuator bearing housing 218 within the magnetic field of an array of permanent magnets (also not separately designated) which are fixedly mounted to the base 202, all in a manner well known in the industry. Electronic circuitry 224 controls operation of the disc drive 200. Control signals drive the VCM 222, as well as data signals to and from the heads 212, and the control signals are carried between the electronic circuitry 224 and the moving actuator assembly via a flexible printed circuit cable (PCC) 226.

It will be apparent to one of skill in the art that the proper operation of the disc drive 200 depends in large part on a controlled, precise relationship between the head assemblies 212 (and the transducers (not shown) coupled thereto) and the discs 206. Therefore, it is common in the industry to test each of the discs 206 included in the disc drive 200 before the discs 206 are assembled into a disc drive 200. Testing each of the discs 206 includes detecting thermal asperities and magnetic defects.

Conventionally, the flying height of heads for a disc drive is measured in a special fly height tester prior to installation in the drive. The fly height measurement is usually based on an interferometer method, which becomes less reliable as the flying height is decreased. Active fly height control in a drive can be a solution to the lower flying height required by increased recording density, but this implies that an in situ fly height measurement must be developed to provide the needed information to the active control system.

Referring to FIG. 2, shown is a partial schematic of a disc drive incorporating an example embodiment of a fly height measurement system 100 according to one embodiment of the present invention. The measurement system 100 includes a disc 110 and a head 120. The head 120 typically also includes a read element and a write element (not shown). The read and write elements can also be fabricated from a single element.

The disc 110 includes at least one radial groove 114. The radial groove 114 has a depth, which is preferably between 10 nanometers (nm) and 50 nm, and more preferably between 20 nm and 40 nm. The groove 114 can extend radially along the entire surface 112 of the disc 110. However, it is not necessary to extend the entire radius, and the groove 114 can also be in the shape of a localized hole or divot (not shown).

The measuring system 100 further includes a signal processing circuit 130 for processing an electrical measurement signal that is produced when the disc 110 is rotating and the head 120 passes over the surface of the disc 110. When a groove 114 passes under the head 120, a vertical spacing signal proportional to the vertical spacing between the groove 114 and the head 120 is produced. The electrical measurement signal is generated when the head 120 passes over each of the one or more grooves 114.

Figure 3:
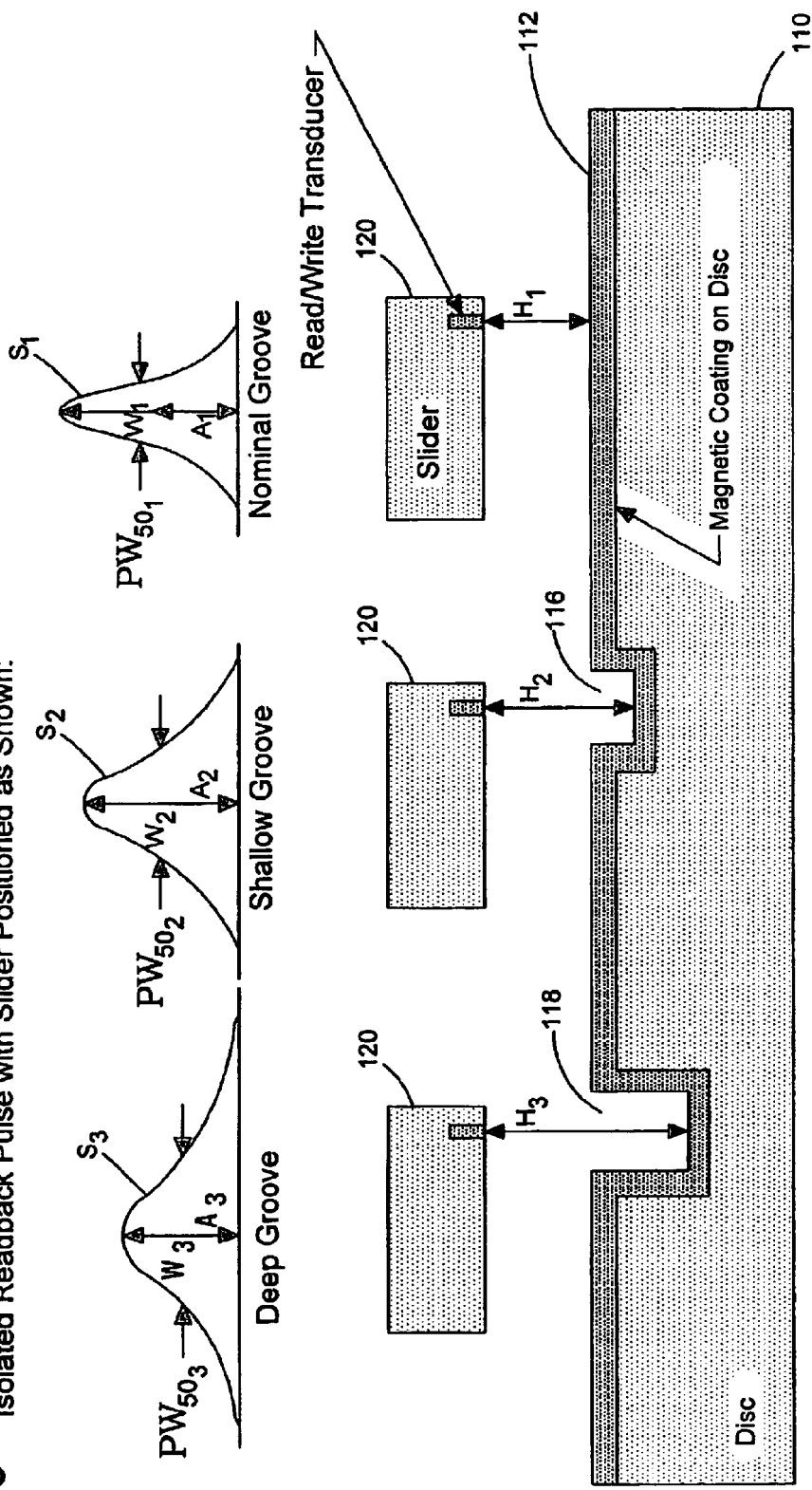
FIG. 3 is a partial side view of a disc including radial grooves and a signal associated with a read head passing over each groove.

Referring to FIGS. 2 and 3, the fly height measurement is derived from the measurement of the perturbation in the $PW_{50}$ (read back pulse width at 50% amplitude) of the signal, induced by the presence of the grooves 114. This technique is based on the fact that when the head 120 flies above the grooves 114, there is a perturbation in the pressurization under the slider, leading to a modulation of the flying height. For example, for a head 120 flying at 25 nanometers passing over a groove 20 nanometers deep, there will be a modulation of the fly height of about 5 nanometers after the slider passes the groove 114, 116, 118.

The signal modulation depends on the absolute flying height and on the depth and width of the groove 114. Since the $PW_{50}$ is proportional to the flying height, any increase of the flying height due to the influence of the groove 114 is detected as an increase of the width of the pulse read after the groove 114. Similarly, any decrease of the fly height causes a corresponding decrease in the width of the pulse. The amplitude of the variation of the $PW_{50}$ is proportional to the change in the fly height, change which is itself proportional to the nominal, unperturbed fly height.

Referring to FIG. 3, a head 120 is shown flying at a first height H1 over a portion of the surface of the disc 112 without a groove 114. A first signal S1 corresponding to the no groove 114 condition is generated. The $PW_{50}$ of the first signal S1 is found by measuring the width W1 of the pulse in the signal at fifty percent of the maximum amplitude A1 of the signal S1. The head 120 is also shown in a position flying at second height H2 after passing over a shallow groove 116. Shallow grooves 116 are preferably between 10 nm and 50 nm deep into the surface 112 of the disc 110. More preferably, shallow grooves 116 range between 10 nm and 30 nm. A second signal S2 is generated after the head 120 passes over the shallow groove 116. The $PW_{50}$ W2 of the second signal S2 is measured at fifty percent of the maximum amplitude A2 of the second signal S2. The head 120 is additionally shown flying at a third height H3 after passing a deep groove 118. Deep grooves 118 are preferably between 30 nm and 80 nm deep into the surface 112 of the disc 110. More preferably, deep grooves 118 range between 40 nm and 60 nm. A third signal S3 is generated after the head 120 passes over the deep groove 118. The $PW_{50}$ W3 of the third signal S3 is measured at fifty percent of the maximum amplitude A3 of the third signal S3. It will be apparent to one of skill in the art that the depth of the grooves 114, 116, 118 discussed is not exhaustive and the ranges are chosen for illustrative purposes. The depth of the groove 114, 116, 118 chosen can depend on many parameters, including operating environment, manufacturing tolerances and the nominal fly height at which the system operates.

Amplitude A2, A3 of the modulation of the flying height, H2, H3 is itself correlated to the absolute fly height. Therefore, the measurement in the drive of the $PW_{50}$ W1, W2, W3 variations due to the grooves 114, 116, 118 provides an indirect measurement of the flying height of the head 120. One example relationship is based on the Williams-Comstock model, which relates the relation between the $PW_{50}$ and the flying height by the approximate formula:

$$PW_{50}=k[(g^2+gt+12.2f^2)^{1/2}+1.1(HMS+\delta/2)]$$

Where HMS is the head-media separation (including the flying height), which is typically between 0.5 microinches and 2.5 microinches, f is transition parameter, which is typically between 30 nm and 60 nm, δ is media thickness, which is typically between 10 nm and 50 nm, g is read gap length, which is typically between 100 nm and 400 nm, and t is magnetoresistive element stripe thickness, which is typically between 10 nm and 40 nm. The parameter k is a constant, with a value of 1.3.

When a head 120 at the correct target flying height H1 passes over a groove 114, 116, 118, a perturbation ΔFH of the flying height is induced. This translates into a variation $\Delta PW_{50}$ from which the ratio $PW_{50}/\Delta PW_{50}$ can be calculated and stored as a reference value. If the head flies too high, the value of $PW_{50}$ is increased, but the modulation of the fly height due to the groove decreases, and therefore the ratio $(\Delta PW_{50}/PW_{50})_{high\ flyer}$ decreases. If the head flies too low, the value of $PW_{50}$ is decreased, but the modulation of the fly height due to the groove increases, and therefore the ratio $(\Delta PW_{50}/PW_{50})_{low\ flyer}$ increases. For example, for a head with a correct flying height of 10 nanometers, and using typical values for the various parameters effecting $PW_{50}$, a modulation of the flying height of ±2 nanometers gives a ratio $\Delta PW_{50}/PW_{50}$ equal to 3.2%. If the head flies at 12 nanometers, this ratio becomes equal to 2.6%, if the head flies at 8 nanometers, the ratio is equal to 4%.

One advantage of this method is that it can differentiate between a wrong $PW_{50}$ due to undesirable fly height and a wrong $PW_{50}$ due to an electrical defect of the head. For example, with the previous numbers for a head flying at the target fly height of 10 nanometers, but having a high $PW_{50}$ due to electrical defect, the ratio $\Delta PW_{50}/PW_{50}$ would still be equal to 3.2% since the FH modulation would be in the correct range.

To illustrate, the previously described method of determining fly height, in one preferred embodiment, a 40 nanometer deep, 20 micron wide radial groove is created on the disc, located in the servo area. The signal read by the head prior to encountering the groove can be used as a base or reference level. The modulation of the signal is analyzed by looking at the signal after the groove has passed under the head. The different values of the ratio $\Delta PW_{50}/PW_{50}$ are then compared with the theoretical values calculated from the model ($PW_{50}$ calculation, air bearing surface design, modulation of the fly height due to a groove) developed for the specific head media combination used in the drive. In another example embodiment, several radial grooves can be produced on the disc. Using grooves of differing depth would increase the sensitivity and the accuracy of the method.

Figure 4:
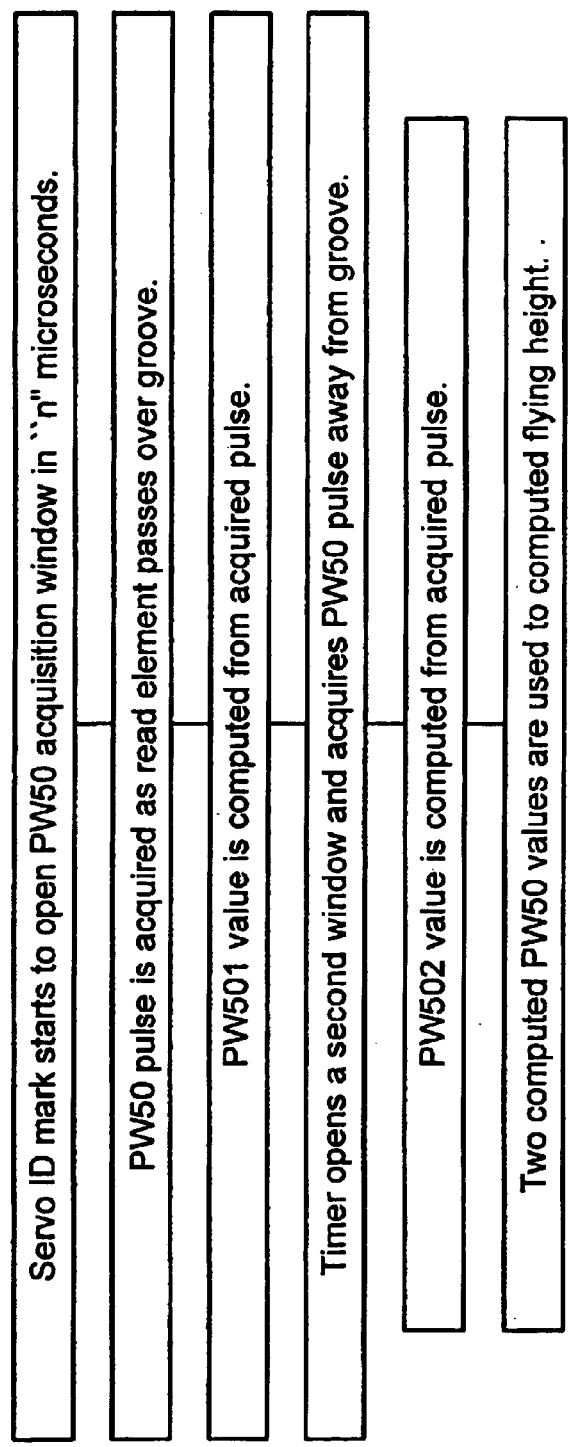
FIG. 4 is a flowchart showing an example embodiment of a method of measuring fly height using an example embodiment of the present invention.

Referring now to FIGS. 2–4 generally, in one example embodiment the present invention is direct to a measurement system (such as 100) for determining the fly height of a head (such as 120) in a disc system (such as 200). The measurement system (such as 100) includes a disc (such as 110) having one or more radial grooves (such as 114) patterned in the disc surface (such as 112). The measurement system (such as 100) also includes a head (such as 120) for reading a signal (such as S2) generated when the disc (such as 110) is rotating and also includes a signal processing circuit (such as 130) for processing an electrical measurement signal (such as S2) to produce a vertical spacing signal proportional to the vertical spacing between the one or more grooves (such as 114) and the head (such as 120). The electrical measurement signal (such as S2) is generated when the head (such as 120) passes over each of the one or more grooves (such as 114).

In one example embodiment, the measurement system (such as 100) includes at least one radial groove (such as 114) that is 20 nanometers deep and 20 microns wide and the groove (such as 114) is located on a servo area of the disc (such as 110). In another example embodiment, the disc (such as 110) is made from a material selected from the group comprising aluminum or glass. In another example embodiment, the signal processing circuit (such as 130) measures the pulse width (such as W2) of a signal (such as S2) induced in the head (such as 120) when the head (such as 120) passes over the groove (such as 114).

Another example embodiment is directed to a method for determining fly height in a system (such as 200) having a head (such as 120) flying over the surface (such as 112) of a rotating disc (such as 110) where the surface (such as 112) has at least one radial groove (such as 114). The method includes measuring a first pulse width (such as W1) of a first signal (such as S1) when the head (such as 114) is flying over the surface (such as 112) in a region not containing a radial groove. The method further includes measuring a second pulse width (such as W2) of a second signal (such as S2) when the head has passed over a groove (such as 114) and comparing the ratio of the pulse widths (such as W1, W2) to determine the height (such as H1) the head (such as 120) is flying over the surface (such as 112).

Another example embodiment of the present invention is directed to a fly height measurement system (such as 100) for a disc drive (such as 200) having a head (such as 120) for reading information to and from a data storage disc (such as 110) when the disc (such as 110) is rotating. The fly height measurement system (such as 100) includes a disc drive (such as 200) having a spindle hub securing a data storage disc (such as 110). The data storage disc (such as 110) includes a surface (such as 112) having at least one radial groove (such as 114). The disc drive (such as 200) further includes a head (such as 120) disposed adjacent the surface (such as 112). The fly height measurement system (such as 100) further includes measuring means for determining the fly height (such as H1) between the head (such as 120) and the disc surface (such as 112) utilizing a radial groove (such as 114).

In another example embodiment, fly height measurement system contains a plurality of radial grooves (such as 114). In another example embodiment, the groove (such as 114) is 20 nanometers deep and 20 microns wide and the groove (such as 114) is located on a servo area of the disc (such as 110). In another example embodiment, the measuring means measures the pulse width (such as W2) of a signal (such as S2) induced in the head (such as 120) when the head (such as 120) passes over the groove (such as 114). In another example embodiment, the measuring means includes circuitry (such as 130) for computing the read back pulse width at 50% amplitude to produce a first time derivative signal proportional to the vertical spacing between the head (such as 120) and the surface (such as 112).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the present invention can measure the electrical, as well as the mechanical fly height, which can differ. When the electrical and mechanical fly heights differ by a large amount, knowing the electrical fly height gives a more accurate measure of the system performance and capabilities. Numerous other changes may be made which will readily suggest themselves to those skilled in the art and which are encompassed in the spirit of the invention disclosed and as defined in the appended claims.

What is claimed is:

1. A measurement system for determining the fly height of a magnetic head comprising:

a disc having one or more radial grooves patterned in the disc surface, wherein the one or more radial grooves have a different widths and depths;

a head for reading a signal generated when the disc is rotating; and a signal processing circuit for processing an electrical measurement signal to produce a vertical spacing signal proportional to the vertical spacing between the one or more grooves and the head, wherein the electrical measurement signal is generated when the head passes over each of the one or more grooves.

2. The system according to claim 1 wherein the disc is made from a material selected from the group comprising aluminum or glass.

3. The system according to claim 1 wherein the signal processing circuit measures the pulse width of a signal induced in the head when the head passes over the groove.

4. The system according to claim 1 wherein the signal processing circuit comprises circuitry for computing the read back pulse width at 50% amplitude to produce a first time derivative signal proportional to the vertical spacing between the first and the second objects.

5. The system of claim 1 wherein the signal processing circuit includes a circuit for determining fly height by comparing the ratio of the pulse width at fifty percent of the signal amplitude when the head is passed over a groove and compares it to a reference signal generated when the head is not over a groove.

6. A method for determining fly height in a system having a magnetic head; comprising the steps of:

providing a disc having a plurality of radial grooves, wherein each of said plurality of radial grooves has a different depth and width;

measuring a first pulse width of a first signal when the head is flying over the disc in a region not containing a radial groove;

measuring a second pulse width of a second signal when the head has passed over a first groove of said plurality of radial grooves; and comparing the ratio of the pulse widths to determine the height the head is flying over the disc.

7. The method of claim 1 wherein said step of comparing further includes producing a first time derivative signal proportional to the vertical spacing between the head and the surface of the disc.

8. The method of claim 1 further including measuring a third pulse width of a third signal when the head is flying over a second groove of said plurality of radial grooves.

9. The method of claim 1 further including the step of detecting an electrical defect in the system.

10. The method of claim 8 wherein the fly height being determined is the electrical fly height.

11. A fly height measurement system comprising:

a disc drive including a spindle hub securing a data storage disc, the data storage disc having at least one radial groove in a surface of the disc, the disc drive further including a head disposed adjacent the surface; and measuring means for determining the fly height between the head and the disc surface utilizing a radial groove.

12. The fly height measurement system according to claim 11 wherein the disc contains a plurality of radial grooves.

13. The fly height measurement system according to claim 11 wherein the groove is 20 nanometers deep and 20 microns wide and the groove is located on a servo area of the disc.

14. The fly height measurement assembly according to claim 11 wherein the disc is made from a material selected from the group comprising aluminum or glass.

15. The fly height measurement system according to claim 11 wherein the measuring means measures the pulse width of a signal induced in the transducer when the transducer passes over the groove.

16. The fly height measurement system according to claim 11 wherein said measuring means includes circuitry for computing the read back pulse width at 50% amplitude to produce a first time derivative signal proportional to the vertical spacing between the head and the surface.

* * * * *